United States Patent
Bergacker

(12) 
(10) Patent No.: US 6,272,788 B1
(45) Date of Patent: Aug. 14, 2001

(54) FISH HOOK REMOVING DEVICE

(76) Inventor: John W. Bergacker, 1009 NE. 104 St., Miami Shores, FL (US) 33138

( * ) Notice: Subject to any disclaimer, the term of this patent is extended or adjusted under 35 U.S.C. 154(b) by 0 days.

(21) Appl. No.: 09/570,453

(22) Filed: May 12, 2000

(51) Int. Cl.[7] .................................................. A01K 97/18
(52) U.S. Cl. ................................................................ 43/53.5
(58) Field of Search ................................................. 43/53.5

(56) References Cited

U.S. PATENT DOCUMENTS

| | | | |
|---|---|---|---|
| 2,164,907 | * 7/1939 | Falkner | 43/53.5 |
| 2,777,244 | * 1/1957 | McKinley | 43/53.5 |
| 3,009,280 | * 11/1961 | Hunter et al. | 43/53.5 |
| 3,011,286 | * 12/1961 | Wallace | 43/53.5 |
| 3,132,438 | * 5/1964 | Ward et al. | 43/53.5 |
| 3,377,735 | * 4/1968 | Daughtry | 43/53.5 |
| 3,419,924 | * 1/1969 | Archibald | 43/53.5 |
| 3,670,448 | * 6/1972 | Wehmeyer | 43/53.5 |
| 3,680,248 | * 8/1972 | Wilkinson | 43/53.5 |
| 4,014,130 | * 3/1977 | Roberts | 43/53.5 |
| 4,882,871 | * 11/1989 | Marina | 43/53.5 |
| 4,947,576 | * 8/1990 | Hull et al. | 43/53.5 |
| 5,644,865 | * 7/1997 | Harrison et al. | 43/53.5 |
| 6,032,403 | * 3/2000 | Steck, III | 43/53.5 |
| 6,038,808 | * 3/2000 | Bergeron et al. | 43/53.5 |
| 6,138,401 | * 10/2000 | Duncan | 43/53.5 |

FOREIGN PATENT DOCUMENTS

| | | | |
|---|---|---|---|
| 828416 | * 12/1969 | (CA) | 43/53.5 |
| 586925 | * 10/1933 | (DE) | 43/53.5 |
| 1291992 | * 3/1962 | (FR) | 43/53.5 |
| 2100102 | * 12/1982 | (GB) | 43/53.5 |
| 2294190 | * 4/1996 | (GB) . | |
| 2300554 | * 11/1996 | (GB) . | |
| 8-172996 | * 7/1996 | (JP) . | |
| 8-256654 | * 10/1996 | (JP) . | |
| 9-9845 | * 1/1997 | (JP) . | |

* cited by examiner

Primary Examiner—Darren W. Ark
(74) Attorney, Agent, or Firm—Michael W. York

(57) ABSTRACT

A fish hook removing device for manually removing fish hooks from the mouths of fish. The fish hook removing device has an elongated hollow insertable portion that has an outer end portion and an inner end portion. An elongated straight handle portion depends downwardly at an angle from the inner end portion of the insertable portion. The insertable portion has a straight slot in its upper surface for receiving a portion of the fish line near the hook when the fish line is held tight. After the fish line has been inserted into the slot, the insertable portion is pushed into the mouth of the fish until it contacts the hook. A thumb is then placed over the fish line where the fish line exits from the insertable portion to keep the line tight between that point and the fish hook. A jab toward the mouth of the fish that pushes the insertable member into the fish mouth followed by a pull away from the mouth of the fish while the thumb is held in place removes the hook from the mouth of the fish.

4 Claims, 1 Drawing Sheet

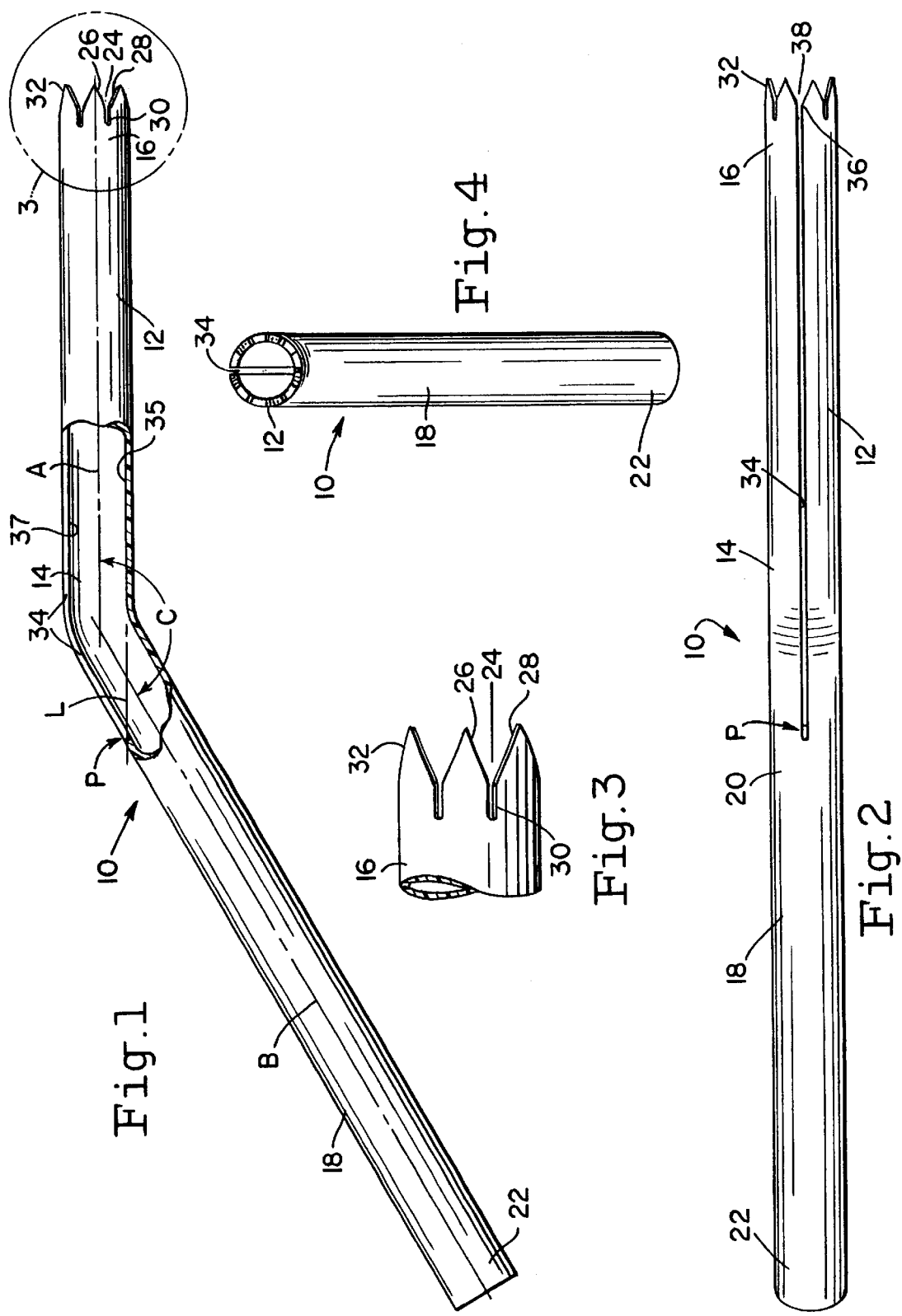

FISH HOOK REMOVING DEVICE

BACKGROUND OF THE INVENTION

Removing a fish hook from the mouth of a fish can at best be difficult unless the hook is located near the lips of the mouth of the fish where it is readily visible and easily grasped by the hand of the person who is fishing. One basic problem is, of course, that most hooks are barbed and hence specifically designed so that the fish cannot readily expel the hook from its mouth, since after the hook penetrates flesh the barbed portion tends to dig in or penetrate additional flesh when a reverse or rearward pulling force is exerted upon the hook. In spite of the barb or barbs it is still fairly easy to remove the hook from the mouth of the fish if the hook is readily visible which means that the fish is hooked at or near the lips of the mouth.

Unfortunately, all too often the fish swallows the hook so that it is located well beyond the lip area of the mouth of the fish. This is desirable in terms of catching the fish since it is difficult or impossible for the fish to expel the hook from its mouth and hence this usually insures that the fish remains caught when the fish line is reeled in. However, after the fish is caught the hook needs to be removed. In this situation the hook is not readily accessible and may not even be in a location where it can be seen. Merely pulling out on the fish line to attempt to pull the fish hook out will only result in setting the hook in deeper so that it is even more difficult to remove the hook.

In many cases, the person trying to remove the hook from the mouth of the fish will resort to some type of pliers and will attempt to grasp the hook with the nose portion of the pliers. However, it is quite common for the hook not to be readily visible and in this case it is difficult to grasp the hook with the nose of the pliers. Even if the hook can be grasped with the pliers, it may still be difficult to remove the hook and it may be necessary to pull the hook out by pulling it through the flesh in the mouth of the fish. This can damage or break the hook and in most cases it causes sufficient damage to the fish so that it will die. Consequently, this prevents keeping the fish alive until it is cleaned or returning the fish to the water it came from so that it can grow larger.

These problems associated with removing fish hooks from the mouths of fish after they have been caught are overcome or avoided by this fish hook removing device invention. This fish hook removing device invention allows a hook to be removed from the mouth of the fish even though the fish hook cannot be seen by the person removing the hook and even if the hook has been swallowed by the fish and hence is located in the fish well beyond the lips of the mouth of the fish. Since the hook does not need to be visible this fish hook removing device invention is particularly useful at night when adequate light may not be readily available.

The fish hook removing device also avoids damaging the fish hook and line, and minimizes the damage done to the fish by removing the hook. The fish hook removing device is particularly suitable for hook and release fisherman in that the fish need not be touched or taken from the water to remove the hook since only the fish hook removing device and the fish line needs to be touched to put the fish hook removing device on the fish line and insert it into the mouth of the fish. The fish hook removing device is easy to use by even an inexperienced person. Moreover, the fish hook removing device is light in weight and is easily carried or stored when not in use.

SUMMARY OF THE INVENTION

This invention relates to removing fish hooks from fish and more particularly to devices for removing fish hooks from fish.

Accordingly, it is an object of the invention to provide a fish hook removing device for removing fish hooks from fish that effectively removes fish hooks from the mouth of fish.

It is an object of the invention to provide a fish hook removing device for removing fish hooks from fish that does not require manual manipulation of the hook.

It is an object of the invention to provide a fish hook removing device for removing fish hooks from fish that does not require manual contact with the hook.

It is an object of the invention to provide a fish hook removing device for removing fish hooks from fish that does not damage the hook.

It is an object of the invention to provide a fish hook removing device for removing fish hooks from fish that does not require cutting the fish line.

It is an object of the invention to provide a fish hook removing device for removing fish hooks from fish that does not damage the fish line.

It is an object of the invention to provide a fish hook removing device for removing fish hooks from fish that does not damage artificial flies.

It is an object of the invention to provide a fish hook removing device for removing fish hooks from fish that does not require manually touching the fish.

It is an object of the invention to provide a fish hook removing device for removing fish hooks from fish that has a handle that can have various lengths.

It is an object of the invention to provide a fish hook removing device for removing fish hooks from fish that does require removing the fish from the water.

It is an object of the invention to provide a fish hook removing device for removing fish hooks from fish that does minimal damage to the fish.

It is an object of the invention to provide a fish hook removing device for removing fish hooks from fish that can be readily used on live fish.

It is an object of the invention to provide a fish hook removing device for removing fish hooks from fish that can be readily used with catch and release fishing programs or regulations.

It is an object of the invention to provide a fish hook removing device for removing fish hooks from fish that is easy to use.

It is an object of the invention to provide a fish hook removing device for removing fish hooks from fish that can be used by an inexperienced fishing person.

It is an object of the invention to provide a fish hook removing device for removing fish hooks from fish that does not require complex manipulations for its effective use.

It is an object of the invention to provide a fish hook removing device for removing fish hooks from fish that does not require complex instructions for its effective use.

It is an object of the invention to provide a fish hook removing device for removing fish hooks from fish that can be used with a wide range of sizes of fish hooks.

It is an object of the invention to provide a fish hook removing device for removing fish hooks from fish that can be used with a wide variety of types of fish hooks.

It is an object of the invention to provide a fish hook removing device for removing fish hooks from fish that can be used with a wide variety of types of fish.

It is an object of the invention to provide a fish hook removing device for removing fish hooks from fish that can be used with a wide variety of sizes of fish.

It is an object of the invention to provide a fish hook removing device for removing fish hooks from fish that is easy to manufacture.

It is an object of the invention to provide a fish hook removing device for removing fish hooks from fish that is inexpensive to manufacture.

It is an object of the invention to provide a fish hook removing device for removing fish hooks from fish that requires no care.

It is an object of the invention to provide a fish hook removing device for removing fish hooks from fish that is easy to carry.

It is an object of the invention to provide a fish hook removing device for removing fish hooks from fish that is easy to store when it is not in use.

It is an object of the invention to provide a fish hook removing device for removing fish hooks from fish that can float in water.

These and other objects of the invention will be apparent from the following described fish hook removing device invention that has an elongated hollow insertable portion with an inner end portion and an outer end portion and an elongated straight handle portion depending downwardly at an angle from the inner end portion of the insertable portion. The insertable portion has a straight slot for receiving a portion of the fish line near the hook while the fish line is held tight. After the fish line has been inserted into the slot, the insertable portion is pushed into the mouth of the fish until it contacts the hook. A thumb is then placed over the end of the slot in the handle portion where the fish line exits to keep the line tight between the point where the thumb pressure is applied and the fish hook. A jab toward the mouth of the fish followed by a pull away from the mouth of the fish while the thumb is held in place removes the hook from the mouth of the fish. The fish line and hook are easily removed from the fish hook removing device by pulling the line through the slot in the insertable portion.

BRIEF DESCRIPTION OF THE DRAWINGS

The invention will be hereinafter more fully described with reference to the accompanying drawings in which:

FIG. 1 is a side elevational view of the fish hook removing device invention with a portion thereof broken away;

FIG. 2 is a top plan view of the fish hook removing device set forth in FIG. 1;

FIG. 3 is an enlarged view of a portion of the structure set forth in FIG. 1 taken within the circle 3 thereof; and FIG. 4 is an end elevational view of the fish hook removing device invention illustrated in FIGS. 1 and 2.

DETAILED DESCRIPTION OF THE PREFERRED EMBODIMENT

The fish hook removing device invention is illustrated in FIGS. 1 and 2 and is designated generally by the number 10. The fish hook removing device 10 includes an elongated hollow insertable portion 12 that has two opposite end portions 14 and 16. Another elongated hollow straight handle portion 18 extends downward from the end portion 14 of the insertable portion 12. In this connection, the handle portion 18 has two opposite end portions 20 and 22 and the end portion 20 is connected at an angle to the end portion 14 of the insertable portion 12 so that the long axis B of the handle portion 18 makes an angle C with the long axis A of the elongated hollow insertable portion 12. In the preferred embodiment this angle C has a value in degrees as set forth below:

$$140 \leq C \leq 160$$

The other end portion 16 of the insertable portion 12 has a series of notches 24. Each notch 24 has inward sloping surfaces 26 and 28 that slope toward and terminate at a slot 30. This slot is sized to accept hooks from size two through sixteen. It should also be noted that the end portion 16 has beveled edges 32 that reduce friction between the mouth of the fish and the outer end portion 16 when the outer end portion 16 is inserted into the mouth of a fish.

As best illustrated in FIG. 2, a straight cut or slot 34 is provided in the top of the elongated hollow insertable portion 12. It will be noted that this cut or slot 34 is located in the center of the top portion of the insertable portion 12. This slot 34 extends from the end portion 16 to the other end portion 14 and past the point where the end portion 14 intersects the adjacent end portion 20 of the handle portion 18 and partially into the end portion 20 so that its termination point is at a point P that is on a line L that is formed by an extension of the straight inside wall 35 that is opposite the straight wall 37 with the slot 34 in the insertable portion 12. The other outer end 36 of the slot 34 terminates in a notch 38. The purpose of this notch 38 is to assist in guiding the fish line into the slot 34.

The fish hook removing device 10 invention is made and used in the following manner. In the preferred embodiment the elongated hollow insertable portion 12 and the elongated hollow straight handle portion 18 of the fish hook removing device 10 are made from a straight portion of a hollow plastic tube that is bent after it is softened by heating at the desired juncture of the elongated hollow insertable portion 12 and the elongated hollow straight handle portion 18. After being suitably heated, this straight portion of a hollow plastic tube that is bent by applying suitable pressure to the straight hollow plastic tube portion to form the elongated hollow insertable portion 12 and the elongated hollow straight handle portion 18 so that the long axis B of the handle portion 18 makes an angle C with the long axis A of the elongated hollow insertable portion 12 as illustrated in FIG. 1. Both the handle portion 18 and the insertable portion 12 can have various lengths to suit the needs of the expected user.

Although it is desirable that the fish hook removing device 10 be manufactured from a hollow plastic tube since it provides a light weight fish hook removing device 10, it should be understood that the fish hook removing device 10 can be manufactured from a solid circular cross section rod if it is desired. The fish hook removing device 10 can also be manufactured from a low density plastic that is known in the art so that the fish hook removing device 10 floats in water. This is important in preventing loss of the fish hook removing device 10 in the event that the person using the fish hook removing device 10 drops it into the water.

The notches 24 on the end portion 12 can either be molded in the end portion 16 using suitable techniques known in the art or they can be cut using suitable standard cutting tools and techniques. The beveled edges 32 can also be formed by molding or by suitable polishing techniques known in the art. The slot 34 in the top of the insertable portion 12 is molded or is cut using known cutting techniques.

The fish hook removing device 10 is used by holding the fish line that is located near the fish hook tight and then placing the tight fish line in the slot 34 in the insertable portion 12. After the fish line has been inserted into the slot 34, the insertable portion 12 is pushed into the mouth of the fish until it contacts the hook. A thumb is then placed over the rear end portion 14 of the insertable portion 12 where the fish line exits to keep the line tight between that point and the fish hook. A jab with the insertable portion 12 toward the mouth of the fish followed by a pull away from the mouth of the fish while the thumb is held in place removes the hook from the mouth of the fish. The fish line and hook are easily removed from the fish hook removing device by pulling the line through the slot 34 in the insertable portion 12.

Although the invention has been described in considerable detail with reference to a certain preferred embodiment, it will be understood that variations or modifications may be made within the spirit and scope of the invention as defined in the appended claims.

What is claimed is:

1. A fish hook removing device for removing a hook from the mouth of a fish comprising a hollow tubular member having an elongated insertable portion with an outer end and an inner end, an upper surface and straight interior walls and a long axis and an elongated handle portion connected to the inner end of said elongated insertable portion and having an upper surface and interior walls and a long axis with the long axis of said elongated handle portion and the long axis of said elongated insertable portion forming an angle greater than or equal to 140 degrees and less than or equal to 160 degrees, said elongated insertable member and said handle portion having a straight slot located in one of the interior walls with the upper surface of said elongated insertable portion and a portion of one of the interior walls with the upper surface of said elongated handle portion, said straight slot extending from the outer end of said elongated insertable member to a termination point on the upper surface of said elongated handle portion located by a straight line extension of a straight interior wall of said elongated insertable portion opposite the straight interior wall with the slot in said elongated insertable portion.

2. The fish hook removing device for removing a hook from the mouth of a fish of claim 1 further comprising flotation means incorporated in said hollow tubular member for causing said fish hook removing device to float.

3. The fish hook removing device for removing a hook from the mouth of a fish of claim 2 wherein said flotation means comprises a low density plastic.

4. The fish hook removing device for removing a hook from the mouth of a fish of claim 3 further comprising a notch in the outer end of said elongated insertable member located to intersect said straight slot in the outer end of said elongated insertable member.

\* \* \* \* \*